United States Patent [19]
Ayel et al.

[11] 3,767,473
[45] Oct. 23, 1973

[54] METHOD OF MANUFACTURING SEMICONDUCTOR SINGLE CRYSTALS

[75] Inventors: Michael Ayel, Caen; Jean-Pierre Besselere, Plumetot Par Douvres; Bernard Lambert, Mathieu, all of France

[73] Assignee: U.S. Philips Corporation,, New York, N.Y.

[22] Filed: Dec. 9, 1971

[21] Appl. No.: 206,380

[30] Foreign Application Priority Data

Dec. 11, 1970 France .............................. 7044664
Dec. 11, 1970 France .............................. 7044665

[52] U.S. Cl. .............. 148/1.6, 148/172, 23/301 SP, 252/62.3 GA, 423/87, 423/88, 423/111
[51] Int. Cl. .............................................. H01l 7/38
[58] Field of Search ............................ 148/1.6, 172; 23/301 SP, 305, 301 R; 252/62.3 GA; 423/87, 88, 111

[56] References Cited

UNITED STATES PATENTS

| | | | |
|---|---|---|---|
| 3,520,810 | 7/1970 | Plaskett et al. | 252/62.3 GA |
| 3,632,431 | 1/1972 | Andre et al. | 148/171 X |
| 3,092,591 | 6/1963 | Jones et al. | 252/62.3 GA |
| 3,194,691 | 7/1965 | Dikhoff | 148/1.6 |
| 3,242,015 | 3/1966 | Harris | 148/1.6 |

*Primary Examiner*—G. T. Ozaki
*Attorney*—Frank R. Trifari

[57] ABSTRACT

A method of manufacturing a compound in the form of a single crystal which comprises the synthesis of the compound and the formation of a single crystal.

The synthesis is obtained by reaction in a closed space of a volatile component with a component in the liquid state after which the liquid phase is contacted with a surface of a seed crystal which initially is arranged at a higher level, after which crystallization is carried out.

The invention may be used for manufacturing rods having good crystal properties, in particular the compounds III–V.

9 Claims, 7 Drawing Figures

*INVENTORS*
MICHEL AYEL; JEAN-PIERRE BESSELERE
and BERNARD LAMBERT
*BY*
AGENT

INVENTORS
MICHEL AYEL; JEAN-PIERRE BESSELERE
and BERNARD LAMBERT
BY
AGENT

METHOD OF MANUFACTURING SEMICONDUCTOR SINGLE CRYSTALS

The invention relates to a method of manufacturing, for example rod-shaped, single crystals of a compound, which method comprises at least a reaction step and a crystallization step, in which during the reaction step a first volatile component of the compound is reacted with a second component in the liquid phase, while the ratio of the quantities of the components which during the reaction are present in a closed space corresponds substantially to the stoichiometric composition of the compound, and in which during the crystallization step the liquid phase is contacted with a seed crystal and the seed crystal is caused to grow by moving a temperature gradient, which is positive in the direction from the seed crystal to the liquid phase.

The obtaining of semiconductor compounds in a solid monocrystalline form comprises two essential phases: the reaction between the pure components and the formation of the single crystal between which other processes are sometimes included, for example, purification or doping. In the methods based on the so-called horizontal Bridgman method a polycrystalline rod which is obtained previously in a closed space by reaction of a pure volatile component and another pure component which is maintained in the liquid phase in zone the temperature of which is significantly higher than the melting temperature of the compound, is afterwards transferred to a horizontal closed space and melted under the vapour pressure of the most volatile component, after which a gradual crystallization enables the formation of a single crystal by careful movement of a temperature gradient.

It is to be noted that a pure component is to be understood to relate to a material which comprises no undesirable impurities but which may contain additions in certain quantities, for example doping agents, which will hereinafter be referred to as doping impurities.

It has been endeavoured to carry out the synthesis and the formation of the single crystal without interruption and without cooling of the compound after the synthesis, but it is not very likely that in this manner a single crystal and a fortiori a crystal having the desirable orientation can be obtained, if it is not ensured that the crystallization begins from a properly oriented monocrystalline seed crystal. In this event in order to prevent the seed crystal from being dissolved by a component in the liquid phase during the synthesis, it is necessary that the seed crystal be kept separated from the liquid phase during the synthesis. According to a known method, this result is achieved by tilting the reaction space substantially from the horizontal to the vertical between the reaction and the crystallization. According to this method, however, the liquid from which the crystallization is carried out is a solution of the compound in one of the components and such a method cannot be used in all cases. The migration process of the components in the solution in a vertical space is less suitable for the manufacture of rods of a very large length.

Furthermore, since the growth of a crystal from a solution requires a steep temperature gradient and the crystallization process is slow, this method is more useful for the manufacture of rods of special quality than for industrial purposes.

In addition, the single crystals manufactured by this method may show a comparatively large amount of dislocations.

It is one of the objects of the present invention to mitigate the above-mentioned drawbacks and to enable the manufacture of, for example, a rod-shaped single crystal of a semiconductor compound having good monocrystalline properties and a given orientation starting from a seed crystal and a minimum quantity of pure components by rapid, simple and reproducible processes which require simple devices and which are suitable for industrial manufacture.

The present invention uses a method which comprises a synthesis of the compound from its components in stoichiometric ratios.

The present invention also uses the so-called Bridgman growth method for production of a single crystal by moving a temperature gradient along a quantity of a compound which is in the liquid phase, which gradient extends at least from a temperature higher than the melting temperature of the said compound to a temperature lower than the said melting temperature.

According to the invention, the method of manufacturing, for example rod-shaped, single crystals of a compound, comprises at least a reaction step and a crystallization step. During the reaction step a first volatile component of the compound is reacted with a second component of the compound in the liquid phase, the ratio of the quantities of these components (which during the reaction are present in a closed space) corresponding substantially to the stoichiometric composition of the compound. During the crystallization step the liquid phase is in contact with a seed crystal and the seed crystal is caused to grow by moving a temperature gradient, which is positive in the direction from the seed crystal to the liquid phase. Further the invention is characterized in that prior to the reaction step the seed crystal is provided in a container at a level which is situated beside and, at least during an initial and greater part of the reaction, is higher than the surface of the liquid phase where, at least during the initial and greater part of the reaction, it is free from contact with the liquid phase and after at least the initial and the greater part of the reaction a face of the seed crystal facing the liquid phase is contacted with the liquid phase after which the crystallization takes place.

According to this method no excess whatsoever of one or the other component is necessary, the quantities used of the components are minimum and can be fixed accurately and as a result of this determine an accurate volume of the liquid phase and a correct cross-section of the resulting rod. The crystallization method used enables the manufacture of rods of a large length.

During at least the greater part of the synthesis, the seed crystal is not in contact with the liquid phase which can attack the seed crystal and at the end of the synthesis, the wetting of the seed crystal can be carried out by contacting it with the liquid phase on a part of the face of the said seed crystal, as a result of which the possibility of dislocation in the growing single crystal is reduced.

In a preferred embodiment of the method according to the invention, the seed crystal, at least during the initial and the greater part of the reaction, is free from contact with the liquid phase and after the first part of the reaction, the space is tilted so as to contact the liquid phase with the seed crystal.

The shape and the dimensions of the seed crystal can be chosen as a function of crystallization criteria. The orientation of the seed crystal may be effected as a function of the preferred growth plane chosen.

It is known that the danger of the appearance of monocrystalline dislocations increases with the cross-section of the seed crystal and with the contact surface between the seed crystal and the liquid phase. The cross-section of the seed crystal is preferably chosen to be small and preferably smaller than one fourth of the cross-section of the single crystal to be manufactured. This single crystal may be in the form of a cylinder or a parallelepiped and the part of the container where the seed crystal is provided can be adapted to the geometry of the seed crystal, the play between the seed crystal and this container being small enough for the wetting of the seed crystal to be carried out only on the face facing the liquid phase.

During the crystallization, the seed crystal preferably projects from the liquid phase and the point of the face of the seed crystal facing the liquid phase, which is wetted by the liquid phase, is preferably chosen between one fourth and three fourth of the said surface. The cross-section of the rod at the beginning of the crystallization is thus even further reduced, which results in an improvement of the monocyrstalline property of the formed material.

The method according to the invention maintains all the advantages of the known methods using stoichiometric synthesis melts, in particular the rate of the cyrstallization process and the use of low temperature gradients. Furthermore, the time between the synthesis and the formation of the single crystal is minimum and as a result of this the overall time for the combination of processes is minimized. The method may be used for industrial manufacture.

Certain semiconductor compounds, for example gallium arsenide, show a difference in specific mass between the liquid phase and the solid phase; in the case of gallium arsenide, for example, this difference is in the order of 15 percent. As a result of this, during the gradual crystallization by moving a temperature gradient along a boat, the level of the liquid rises slowly and the cross-section of the resulting rod is not constant. In order to mitigate this drawback it is known to provide the liquid phase in a recipient having a cross-section which increases in the direction of crystallization or a cavity having a constant cross-section which is slightly inclined in its longitudinal direction, so that the effect of said difference in specific mass between liquid and solid is compensated and a crystal having a constant cross-section is obtained. According to a preferred embodiment of the method according to the invention the position of the crystal employed in the container and the shape of the container are chosen to be so that after tilting, the variation in the cross-section of the liquid phase in the direction of crystallization is such that a single crystal of a constant cross-section is obtained.

In another variation, the space is tilted during the crystallization so as to correct the difference in specific volume of the liquid phase and the forming crystal and a single crystal of constant cross-section is obtained.

According to a variation of the method according to the invention, the seed crystal, after the reaction step and prior to the crystallization step, is partly dissolved, by local increase in temperature, at the area where it contacts the liquid phase.

According to this invention, the seed crystal holding the container is moved to an inclined position at such an angle that the free face of the seed crystal is partly wetted by the liquid obtained by the synthesis, after which the zone having the highest temperature in which the liquid mass is situated is elongated in the direction of the said seed crystal until the latter begins to melt and the crystallization gradient is then moved from the said seed crystal parallel to the surface of the liquid volume.

By using the method in this manner, the first nucleation is ensured with greater safety as regards the possiblity of dislocations.

According to another preferred embodiment of the method according to the invention, the seed crystal is free from contact with the liquid phase during the initial and greater part of the reaction and is contacted with the liquid phase during the last part due to an increase in volume of the liquid phase during the reaction step.

As a result of this possibility, the method according to the invention provides a greater freedom as regards the choice of the dimensions of the space, of the position of the seed crystal, and of the quantities of the components to obtain a rod having the desired dimensions.

The method according to the invention is suitable for the manufacture of a rod of doped material. The doping impuritiy is added prior to the synthesis. Said impurity is preferably added in a solid state, for example in the form of crystals or in powder form. The convection currents caused by the increase in temperature of the liquid phase usually are sufficient to ensure a homogeneous distribution of said impurity. Of course other doping methods may also be used which are used either in the known methods of the synthesis of semiconductor compounds or in the known methods of forming single crystals.

It is obvious that the inclination given to the container holding the seed crystal according to the invention at the end of the reaction can also be reduced while maintaining the possibility of obtaining a rod having a constant cross-section, by giving said container, from the beginning of the process on, a certain inclination or by giving the bottom of said container a slightly inclined shape, to which inclination is added that inclination which, after the synthesis, is given to the cavity to obtain the wetting and the desirable compensation.

For example, in the case of gallium arsenide for which the difference of the said specific masses is in the order of 15 percent, the inclination necessary for the above-mentioned compensation for a rod having a trapezoidal cross-section of suitable ratios remains smaller than 2°. In accordance with the length of the rod and the height of the wetting surface of the seed crystal, a preliminary inclination for the said cavity may be necessary.

The temperatures, the temperature gradients and the movement of the gradients which are used in the method according to the invention may be the same as those which are used in the known methods with synthesis starting from stoichiometric melts and in the known methods of manufacturing single crystals.

The synthesis is preferably carried out by gradually bringing the contents of the space at a temperature which is slightly higher than the melting temperature of the compound in which the volatile component is simultaneously and gradually brought at a temperature which after the reaction in the container assures a vapour pressure of said compound which is at least equal to the dissociation pressure of the compound at the melting temperature, the increase in temperature of said volatile component causing such an increase in the vapour pressure thereof that a phase equilibrium is constantly maintained above the contents of the container during the whole synthesis. The increases in temperature carried out according to said method permit a gradual saturation of the melt with minimum thermal energy and in particular a minimum danger of contamination by the walls of the containers and deterioration of said containers.

During the crystallization, the zone where the pure volatile component is provided may be heated at a higher temperature and as is known this is done to avoid any dissociation of the compound by providing an excessive vapour pressure of said component. Since the latter is provided in a stoichiometric quantity, it need not be feared that an excess of said component produces a considerable rise in pressure with the danger of explosion.

The present invention also relates to a device for using the above-described method, which device comprises a tubular closed space which is substantially horizontal and is divided into two zones, means being provided to bring each of the said zones at certain temperatures and to move a certain temperature gradient along a first of the said two zones, and which is characterized in that an oblong boat is provided in the said first zone and one of the ends of which is provided with a boss the bottom of which lies at an elevated level relative to the remainder of the boat, the cross-section of the said boss being smaller than that of the remainder of the boat and the said space being connected to the said remainder by a conical part of the boat.

In the device according to the invention means are preferably provided to give the said space a small inclination of a given value.

These means for bringing the various parts of the space to the desirable temperatures preferably consists of a tubular resistance furance which comprises various heating zones which can be controlled independently of each other according to a suitable program. The furnace comprises in addition an inspection window which enables notably the wetting of the seed crystal and the beginning of the crystallization to be observed and controlled.

The above-characterized device is not more complicated than the devices used in the known methods and permits the reaction and crystallization to be carried out in it. The walls of the space and the boat may be manufactured from the same materials, usually vitreous silicon dioxide. The conical connection part is determined as a function of the optimum growth conditions during the change of the cross-section of the formed rod. The inclination of said conical part is preferably in the order of 15 percent.

The present invention may be used for manufacturing monocrystalline rods of a large volume and good crystalline properties which are required to manufacture electronic devices from semiconductor compounds, such as the so-called III–V compounds which contain an element of group III and an element of group V of the periodic system of elements and in particular gallium arsenide. In certain circumstances the manufactured crystals may also contain more than one compound. The invention is preferably suitable to obtain rods having a very small content of dislocations.

The invention also relates to a single crystal, preferably a monocrystalline rod, manufactured by means of the method according to the invention.

In order that the invention may be readily carried into effect, it will now be described in greater detail, by way of example, with reference to the accompanying drawings, in which.

The following description relates to the manufacture of a monocrystalline rod of gallium arsenide which has been chosen by way of a non-limiting example. In this example the volatile component is arsenic, the other component is gallium.

Figure 1:
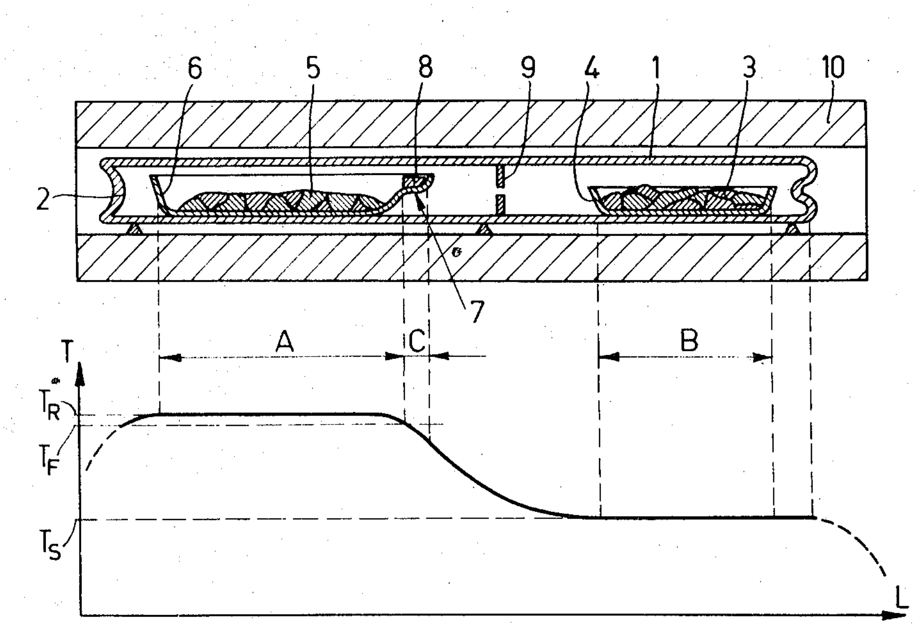
FIG. 1 is a longitudinal cross-sectional view of a device which is manufactured according to the method of the invention at the beginning of the manufacture, while below said cross-sectional view a curve indicates the distribution of the temperatures during the reaction of the components.

In the device shown diagrammatically in FIG. 1, a tubular space 1 of which one end is closed by a sealed stopper 2 comprises on the one hand the volatile component 3 placed in the boat 4 and on the other hand the second component in a substantially stoichiometric ratio relative to the mass 3 in a boat 6. The shape of the boat 6 is oblong and corresponds to the shape and the dimensions of the rod to be obtained. The principal cavity of said boat is elongated at 7 which elongation constitutes a boss for a properly oriented seed crystal 8. A partition 9 between the two boats divides the volume of the space 1 into two parts, said partition 9 serving as a thermal screen between the two parts and comprising a small aperture for the passage of a gas or a vapour.

The space 1 is provided horizontally in a furnace 1o which comprises several controlled heating zones which are positioned horizontally and which produce along the space 1 a certain temperature variation T. After providing the components and the seed crystal in the space 1 and closing said space and arranging the seed crystal in its place in the furnace 10, the temperature T in the said space is brought to the desirable values, and the component 3 evaporated with a vapour pressure which is sufficient for the reaction with the component 5 and the formation of the compound.

The temperature spectrum shown at the bottom of FIG. 1 corresponds to the maximum temperatures achieved in the various parts of the space 1 during the reaction. The volatile component 3 has a temperature $T_S$ which prevails in the whole zone B. The contents of the boat 6 have a temperature $T_R$ which is maintained at least in the whole zone A and which is slightly higher than the melting temperature $T_F$ of the compound. The seed cystal 8 is situated outside said zone A in a location 7 in a temperature gradient zone C which lies between the melting temperature $T_F$ and that of the zone B. L is the furnace length.

Figure 7:
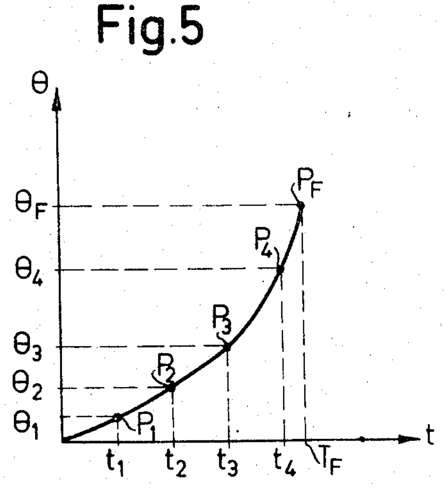
FIG. 7 is a curve which indicates the temperature of the volatile component as a function of the temperature of the liquid phase during the reaction.

During the reaction, the temperature in the space 1 preferably rises gradually in such manner that during the increase in temperature of the contents of the boat 6 the minimum temperature of the colder region of the space in which the volatile component 3 is situated constantly corresponds to a vapour pressure of said component which is at least equal to and preferably slightly higher than the dissociation pressure of the said contents at the temperature which it has in the boat 6. For that purpose the increase in temperature of the said cold region corresponds to the increase in temperature of the liquid phase according to a relation which is shown by the curve of FIG. 7. This curve of the temperature of the cold region $\theta$ as a function of the temperature of the contents of the boat $t$ gives at any temperature $t$ of a solution of the compound in the least volatile component, in equilibrium with a vapour pressure P of the volatile component, the temperature $\theta$ at which the pure volatile component is in equilibrium with the same vapour pressure P.

For example, a solution of gallium arsenide in gallium at the temperature $t$ is in phase equilibrium with an arsenic vapour pressure $P_1$; this arsenic pressure $P_1$ is saturated in the presence of solid arsenic at a temperature $\theta_1$; and the cold region of the space has at least the temperature $\theta_1$ and preferably a slightly higher temperature when the liquid in the boat has the temperature $t_1$. Prior to the end of the reaction, the cold region has reached the temperature $\theta_F$ when the contents of the boat have reached the temperature $T_F$.

Figure 2:
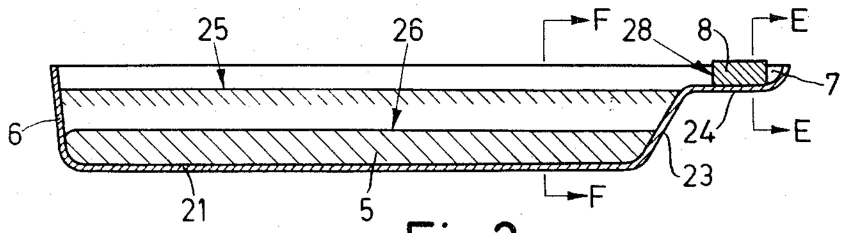
FIG. 2 is a longitudinal cross-sectional view of a boat during the reaction of the components and FIG. 3 is a longitudinal cross-sectional view of the same boat during the crystallization step.
Figure 5:
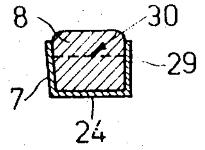
FIG. 5 is a cross-sectional view of a monocrystal in a boss of the boat taken on the line EE of FIG. 2.
Figure 6:
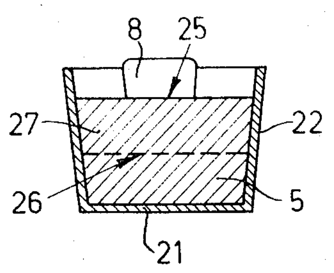
FIG. 6 is a cross-sectional view of a boat taken on the line FF of FIG. 2.

FIGS. 2, 5 and 6 are a diagrammatic longitudinal cross-sectional view and two diagrammatic cross-sectional views, respectively, of the boat 6 of the device shown in FIG. 1. The boat comprises a substantially flat bottom 21 and slightly inclined walls 22 which constitute a main cavity of a large length and trapezoidal cross-section. Of course this profile of the cross-section may be different in accordance with the desirable cross-section of the rod, the trapezoidal cross-section chosen by way of example corresponding to a choice which is generally adopted in the known methods of manufacturing semiconductor rods by a horizontal method. The main space of the boat is connected to the space of the seed crystal 7 by a conical part 23 the inclinations of which ensure the best crystallization conditions when the interface liquid-solid changes from a small cross-section into the maximum cross-section of the rod.

During the gradual increase of the temperature of the boat, the component 5 is first melted, if it is not already liquid at the charging temperature of the boat, and the liquid level 26 of said component then rises during the reaction to 25. The quantities of the components used and the dimensions of the main space of the boat are determined as a function of each other in such manner that the level 25 of the compound 27 which is obtained in the boat in the liquid phase does not reach, at the end of the reaction, the level at which the bottom 24 of the space 7 is situated.

The seed crystal 8 has a plane 28 which is substantially vertical and is directed in the direction of the liquid phase 27. This face is isothermal because it is perpendicular to the longitudinal axis of the furnace 10. The seed crystal 8 is arranged so that the compound in the liquid phase cannot penetrate between the seed crystal and the bottom 24 or the walls 29 of the space.

Figure 3:
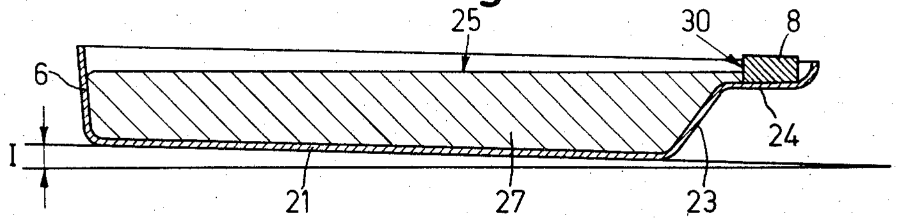

Immediately after the reaction, the boat is tilted at an angle I relative to the horizontal, as is shown in FIG. 3, so that the liquid 27 can partially wet the face 28 of the seed crystal up to the level 30. The wetted surface is preferably chosen to be so small that the danger of dislocations in the crystal to be formed afterwards from said seed crystal surface is reduced.

The inclination of the boat is very small and can be obtained by supporting the boat or preferably by supporting the assembly of the furnace 10 comprising the space 1 with the boat 6, said lateral method avoiding any disturbance of zones and temperature gradients in the space 1.

The crystallization sets in immediately because the liquid has been contacted with the seed crystal which has a lower temperature than the melting temperature of the compound. Said crystallization is continued by moving the temperature gradient, which may have been modified and which elongates the zone A defined in FIG. 1 from the seed crystal in the direction of the liquid phase.

Figure 4:
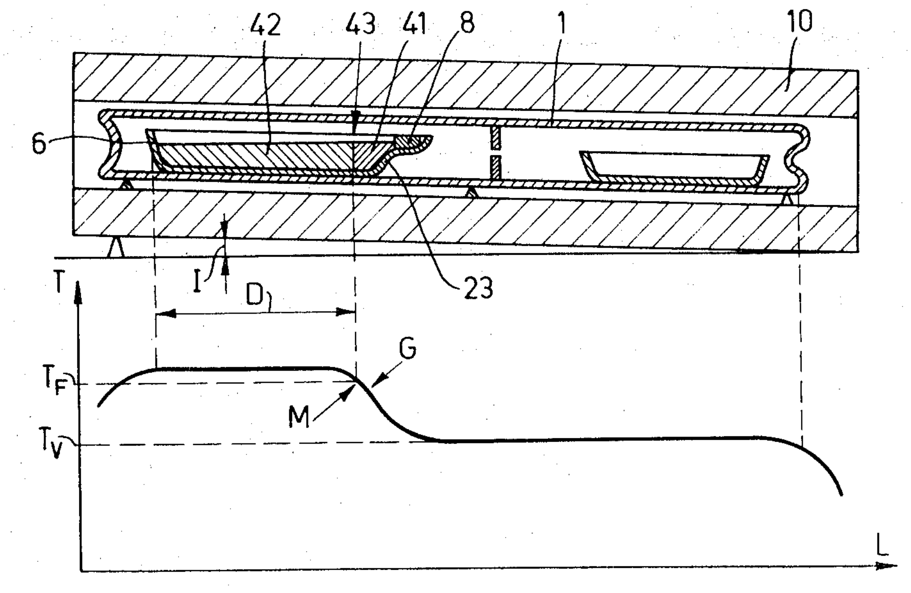
FIG. 4 is a longitudinal cross-sectional view of the device shown in FIG. 1 during the crystallization step below which cross-sectional view a curve indicates the distribution of the temperatures during said manufacture.

The gradual oriented crystallization continues according to said movement of the gradient. FIG. 4 shows diagrammatically the device of FIG. 1 which encloses an angle I with the horizontal as it occurs during the crystallization. A part of the rod 41 has solidified and a part 42 is still liquid, the interface solid-liquid being at 43 in FIG. 4. The temperatures of the space 1 are shown in the temperature spectrum which is shown in the longitudinal cross-sectional view of the device. In its totality, the zone D is above the melting temperature $T_F$ of the compound, the interface solid-liquid 43 lying at the point M of the gradient shown at G which corresponds to the temperature $T_F$. During the crystallization the part of the space which does not relate to the zone D and the gradient G is maintained at a temperature $T_v$ which is higher than the temperature which gives a vapour pressure of the volatile component which is at least equal to the dissociation pressure of the compound.

If permitted by the ratio of the specific mass of the compound in the liquid phase and in the solid phase as well as by the shapes and the dimensions of the rod to be obtained, it is favourable when the angle I of inclination of the device is substantially equal to the angle of inclination of the bottom of the boat 21 which causes a compensation of the effect of the difference in specific masses of the liquid phase and the forming crystal.

If it is not possible, starting from a horizontal bottom of the boat 21, to determine the angle I which presents this advantage prior to inclination, it is favourable to give said bottom a preliminary, additional likewise longitudinal, inclination in one direction or in the other direction from the beginning of the synthesis which permits, due to the inclination I which is necessary for wetting the seed crystal, to easily obtain the compensation of the effect of the difference in specific masses by the combination of said two inclinations.

In the device chosen by way of example and shown in FIGS. 1 and 4, the boat with the liquid phase and the seed crystal is adjusted so that the space of the seed crystal lies between the high and the low temperature zones, the crystallization gradient corresponding to a part of the temperature spectrum which lies between the zone of the highest temperature and the zone of the lowest temperature. An arrangement of the boat in the opposite direction is also possible and will be used, for example, when the means for controlling the zones of the furnace permit an accurate gradient to be obtained only on the side situated opposite to the zone having the lowest temperature.

The use of the method according to the invention for manufacturing monocrystalline rod of gallium arsenide will now be described by way of example.

In a space of vitreous silicon dioxide which is shown diagrammatically in FIG. 1, 300 gms of gallium are provided in a boat 6 having an effective length of 400 mm, and 325 gm of arsenic are provided directly in the space, as well as a monocrystalline seed crystal of a square cross-section having sides of 7 mm and a mass of approximately 7 gms. The boat is destined for a trapezoidal rod cross-section having a base of 20 mm. The seed crystal is chosen and arranged so that its crystallization face is oriented according to a crystal plane 111.

The space is closed in a vacuum of $10^{-7}$ Torr and the boat is heated to 1260°C in approximately 3 hours, the melting temperature of the gallium arsenide being 1237°C. During said rise in temperature the arsenic is gradually brought to 600°C, the seed crystal being always maintained at a temperature lower than 1220°C and being kept out of contact with the liquid phase.

The device is then inclined by supporting one end at an angle which causes the partial wetting of the seed crystal prepared for crystallization. An inclination of 1° to 2° is often found to be sufficient for a height of the liquid in the order of 15 mm.

The crystallization gradient is, for example, 10° per centimeter and moves at a rate in the order of from 5 to 7 mm per hour.

The resulting rod is monocrystalline and has a crystalline orientation plane 111 and the dislocation concentration is lower than $10^3$ per sq. cm.

Another example of an embodiment of the method according to the invention differs from the preceeding embodiment in the following points.

Instead of contacting the liquid phase with the seed crystal by tilting the space after the reaction step, the contacting takes place during a last part of the reaction step by the increase of the volume of the liquid phase during the reaction step. As a result of this, some growth of the seed crystal can already occur during the reaction step. After the reaction step and prior to the crystallization step, the seed crystal is then partially dissolved at the area where it contacts the liquid phase by local increase in temperature. This is carried out, for example, by moving the temperature gradient between the zones of high and low temperatures slightly in the direction of the seed crystal.

As a result of this, the material possibly deposited on the seed crystal during the reaction may be dissolved after which the formation of the single crystal takes place.

What is claimed is:

1. In the method for manufacturing single crystals of a compound by first causing the reaction of a first volatile component of the compound with a second component of the compound in the liquid phase, both of said components being present in stoichiometrical quantities in a closed space and then bringing the liquid phase into contact with a monocrystalline seed crystal and causing said seed crystal to grow by moving a temperature gradient that is positive in the direction from the seed crystal to the liquid phase in the direction from the seed crystal to the liquid phase the improvement which comprises locating the seed crystal and liquid phase in the same container and positioning the seed crystal above and out of contact with the surface of the liquid phase before and at least during the initial and greater part of the reaction, and then contacting a face of the seed crystal with said liquid phase, and then causing crystallization to take place.

2. A method of claim 1, wherein the seed crystal is, at least during the initial and greater part of the reaction, is free from contact with the liquid phase and after the initial part of the reaction, a container holding the liquid phase and the seed crystal is tilted so as to contact the liquid phase with the seed crystal.

3. A method as claimed in claim 1 wherein the seed crystal during the initial and greater part of the reaction is free from contact with the liquid phase and during the last part of the reaction is contacted with the liquid phase by increase of the volume of the liquid phase during the reaction step.

4. A method of claim 1, characterized in that after the reactiOn step and prior to the crystallization step the seed crystal is partly dissolved by a local rise In temperature at the area where it contacts the liquid phase.

5. A method of claim 1 wherein during the crystallization the container holding the liquid phase and the seed crystal it tilted to correct the dIfference in specific volume of the liquid phase and the forming crystal and a single crystal of constant cross-section extended from said seed crystal.

6. A method of claim 1, wherein the location of the seed crystal in the container and the shape of the container are chosen so that after tilting, the variation in the cross-section of the liquid phase in the direction of crystallization is such that a single crystal of a constant cross-section is grown.

7. A method of claim 1 wherein the cross-section of the area of the seed crystal is chosen to be lower than one fourth of the cross-section of the area of the single crystal to be grown.

8. A method of claim 1, wherein during the crystallization the seed crystal projects from the liquid phase.

9. A method of claim 8, wherein the part of the surface of the seed crystal which faces the liquid phase and is wetted by the liquid phase is chosen to be between one fourth and three fourth of the said surface.

* * * * *